(12) United States Patent
Huang et al.

(10) Patent No.: US 9,655,469 B2
(45) Date of Patent: May 23, 2017

(54) PORTABLE SOLAR COOKER

(71) Applicant: HIMIN CLEAN ENERGY HOLDINGS CO, LTD, Dezhou, Shangdong (CN)

(72) Inventors: Ming Huang, Dezhou (CN); Hao Zhao, Dezhou (CN); Jiawu Yu, Dezhou (CN); Yanle Sun, Dezhou (CN); Xili Yu, Dezhou (CN); Jianlin Zhang, Dezhou (CN); Wendong Zhang, Dezhou (CN); Xiutian Zhang, Dezhou (CN); Jianning Wang, Dezhou (CN); Jiqiang Si, Dezhou (CN); Xichao Liu, Dezhou (CN)

(73) Assignee: HIMIN CLEAN ENERGY HOLDINGS CO., LTD, Shangdong (CN)

( * ) Notice: Subject to any disclaimer, the term of this patent is extended or adjusted under 35 U.S.C. 154(b) by 258 days.

(21) Appl. No.: 14/428,641

(22) PCT Filed: Sep. 17, 2013

(86) PCT No.: PCT/CN2013/083616
§ 371 (c)(1),
(2) Date: Mar. 16, 2015

(87) PCT Pub. No.: WO2014/044163
PCT Pub. Date: Mar. 27, 2014

(65) Prior Publication Data
US 2015/0208848 A1    Jul. 30, 2015

(30) Foreign Application Priority Data
Sep. 18, 2012 (CN) .......................... 2012 1 0347875

(51) Int. Cl.
*A47J 27/21* (2006.01)
*A47J 37/07* (2006.01)
(Continued)

(52) U.S. Cl.
CPC ..... *A47J 27/21166* (2013.01); *A47J 37/0763* (2013.01); *F24J 2/02* (2013.01);
(Continued)

(58) Field of Classification Search
CPC .............. A47J 27/21166; A47J 37/0763; A47J 2037/0777; F24J 2/055; F24J 2/02;
(Continued)

(56) References Cited

U.S. PATENT DOCUMENTS 3,106,201 A * 10/1963 Steinberg ................... F24J 2/06
                                                    126/680
4,125,109 A * 11/1978 Erwin ........................ F24J 2/02
                                                    126/681

(Continued)

*Primary Examiner* — Sean Michalski
(74) *Attorney, Agent, or Firm* — Helen S. Liu

(57) ABSTRACT

The present invention discloses a portable solar cooker, belonging to the field of solar heat utilization. The solar cooker comprises an upper functional assembly, a lower control assembly and a rotary apparatus which are sequentially connected, wherein the upper functional assembly is configured to reflect sunlight, collect heat in a focusing manner and further heat water or foods, the upper functional assembly is closed to form a box body when being in a non-operative state, and the upper functional assembly is opened when being in an operative state; the lower control assembly is connected with the upper functional assembly, and makes the upper functional assembly be subjected to pitch adjustment; the lower control assembly is connected with the rotary apparatus, and the lower control assembly and the upper functional assembly are driven by the rotary apparatus to rotate so that tracking the sun is realized. The portable solar cooker disclosed by the present invention not (Continued)

only has functions of boiling water and cooking foods, but also has the advantages of facilitating carrying and tracking the sun, and can achieve full utilization of solar energy anytime and anywhere, thereby making the application of the solar energy be fully developed.

10 Claims, 5 Drawing Sheets

(51) Int. Cl.
| | |
|---|---|
| *F24J 2/02* | (2006.01) |
| *F24J 2/05* | (2006.01) |
| *F24J 2/14* | (2006.01) |
| *F24J 2/50* | (2006.01) |
| *F24J 2/52* | (2006.01) |
| *F24J 2/54* | (2006.01) |

(52) U.S. Cl.
CPC .............. *F24J 2/055* (2013.01); *F24J 2/14* (2013.01); *F24J 2/507* (2013.01); *F24J 2/5233* (2013.01); *F24J 2/5413* (2013.01); *A47J 2037/0777* (2013.01); *Y02B 40/18* (2013.01); *Y02E 10/44* (2013.01); *Y02E 10/45* (2013.01); *Y02E 10/47* (2013.01)

(58) Field of Classification Search
CPC .... F24J 2/5413; F24J 2/14; F24J 2/507; F24J 2/5233; Y02E 10/44; Y02E 10/45; Y02E 10/47; Y02B 40/18
See application file for complete search history.

(56) References Cited

U.S. PATENT DOCUMENTS

| | | | | | |
|---|---|---|---|---|---|
| 4,203,427 | A | * | 5/1980 | Way, Jr. | F24J 2/02 126/25 R |
| 4,262,660 | A | * | 4/1981 | Ilich | F24J 2/02 126/608 |
| 4,281,644 | A | * | 8/1981 | Chiles | F24J 2/02 126/682 |
| 4,284,071 | A | * | 8/1981 | Steinberg | F24J 2/02 126/681 |
| 4,287,876 | A | * | 9/1981 | Jacques | F24J 2/205 126/624 |
| 4,292,957 | A | * | 10/1981 | Golder | F24J 2/02 126/600 |
| 4,378,790 | A | * | 4/1983 | Erwin | F24J 2/02 126/681 |
| D268,980 | S | * | 5/1983 | Erwin | F24J 2/02 D7/324 |
| 4,442,828 | A | * | 4/1984 | Takeuchi | F24J 2/02 126/681 |
| 4,503,839 | A | * | 3/1985 | Dunstan | F24D 17/0021 126/563 |
| 4,848,320 | A | * | 7/1989 | Burns | F24J 2/02 126/600 |
| 5,524,610 | A | * | 6/1996 | Clark | F24J 2/02 126/25 R |
| 5,617,843 | A | * | 4/1997 | Erwin | F24J 2/02 126/608 |
| 5,676,128 | A | * | 10/1997 | Cowart | F24J 2/02 126/657 |
| 5,950,618 | A | * | 9/1999 | Wu | F24J 2/02 126/596 |
| 6,363,928 | B1 | * | 4/2002 | Anderson, Jr. | F24J 2/14 126/573 |
| D510,498 | S | * | 10/2005 | Essig, Jr. | F24J 2/14 D7/324 |
| 7,748,376 | B2 | * | 7/2010 | Bender | F24J 2/4638 126/685 |
| 8,127,759 | B2 | * | 3/2012 | Nix | F24J 2/02 126/627 |
| 8,146,585 | B2 | * | 4/2012 | Shehorn | F24J 2/02 126/681 |
| 8,360,052 | B2 | * | 1/2013 | Nix | F24J 2/02 126/608 |
| 8,668,949 | B2 | * | 3/2014 | Wilson | A47J 33/00 126/9 B |
| 9,291,365 | B2 | * | 3/2016 | Frank | F24J 2/42 |
| 9,404,653 | B1 | * | 8/2016 | Putrello, Jr. | F23Q 13/005 |
| 9,437,766 | B2 | * | 9/2016 | Escher | H01L 31/0547 |
| 2011/0023868 | A1 | * | 2/2011 | Seller | F24J 2/02 126/681 |
| 2012/0263845 | A1 | * | 10/2012 | Shi | A47J 27/04 426/510 |
| 2013/0022727 | A1 | * | 1/2013 | Sherwin | F24J 2/02 426/523 |

* cited by examiner

PORTABLE SOLAR COOKER

This application claims the priority of Chinese Patent Application No. 201210347875X entitled "Portable Solar Cooker" filed on Sep. 18, 2012.

TECHNICAL FIELD

The present invention relates to the field of solar heat utilization, and particularly to a portable solar cooker.

BACKGROUND ART

In modern society, non-renewable energy resources such as coal, petroleum and natural gas are rapidly consumed, resulting in serious shortage of energy resources; the consumption of these energy resources also causes a series of environmental problems. Developing and utilizing novel clean energy resources become a main approach of addressing the energy problem and its resulting environmental problems by people. At present, novel clean energy resources developed by humans mainly include solar energy, wind energy, hydrogen energy, biomass energy, nuclear energy, tidal energy and the like.

Wherein the solar energy has emerged because of its environmental protection property, sustainability, richness, universality and the like, so as to be increasingly enjoyed by people. The solar energy is widely applied to the aspect of supplying hot water, relevant products of solar water heaters have been already well developed, which is a great contribution to the environmental protection.

However, at present, the solar energy is rarely applied to fields such as food processing, which relatively insufficiently makes the solar energy be fully utilized anytime and anywhere.

SUMMARY OF THE INVENTION

To address the problems of the prior art, an embodiment of the present invention provides a portable solar cooker, which can not only realize functions of boiling water and cooking foods, but also has the advantages of facilitating the carrying and tracking the sun. The technical solution is as follows:

there is provided a portable solar cooker, the solar cooker comprises an upper functional assembly, a lower control assembly and a rotary apparatus which are sequentially connected; the upper functional assembly is configured to reflect sunlight, collect heat in a focusing manner and further heat water or foods, the upper functional assembly is closed to form a box body when being in a non-operative state, and the upper functional assembly is opened when being in an operative state;

the lower control assembly is connected with the upper functional assembly, and makes the upper functional assembly be subjected to pitch adjustment;

the lower control assembly is connected with the rotary apparatus, and the lower control to assembly and the upper functional assembly are driven by the rotary apparatus to rotate, so that tracking the sun is realized.

Particularly, the upper functional assembly comprises a bottom case, a left housing, a right housing, reflector plates, a vacuum pipe, a vacuum pipe bracket, a barbecue grill and a water boiling cup;

two sides of the bottom case are respectively provided with the left housing and the right housing, the left housing is movably connected with the bottom case, the right housing is movably connected with the bottom case, the left housing and the right housing are closed when being in the non-operative state, and the left housing and the right housing are opened when being in the operative state;

the number of the reflector plates is two, the two reflector plates are respectively attached to the inner surface of the left housing and the inner surface of the right housing, and the reflector plates are both configured to reflect sunlight to the vacuum pipe;

the vacuum pipe bracket is arranged in the middle of the bottom case, the vacuum pipe is arranged on the vacuum pipe bracket, the barbecue grill is arranged inside the vacuum pipe, the water boiling cup is arranged on the barbecue grill, the vacuum pipe is configured to collect heat and transmit the heat to the barbecue grill and the water boiling cup, the barbecue grill is configured to place foods, and the water boiling cup is configured to place water or foods.

Particularly, the left housing and the right housing are both of a paraboloid shape, and the two reflector plates are shaped to be respectively matched with the left housing or the right housing.

Particularly, the lower control assembly comprises a control cabinet, a connecting structure, a push plate and a telescopic apparatus, the connecting structure and the push plate are arranged outside the control cabinet, fixed connection between the upper functional assembly and the push plate is realized by means of the connecting structure, one side of the push plate is movably connected with the control cabinet, the telescopic apparatus extends out of the control cabinet and is connected onto the upper functional assembly, the push plate and the upper functional assembly are driven by expansion and retraction of the telescopic apparatus to rotate relative to one side of the control cabinet, so that pitch adjustment of the upper functional assembly is realized, and further adjustment of an elevating angle of the solar cooker is realized.

Particularly, the telescopic apparatus is an electric push rod.

Particularly, the connecting structure is a hook type structure, and comprises hooks arranged on the upper functional assembly and slots formed in the push plate.

Particularly, the rotary apparatus comprises a horizontally-arranged wheel and two vertically-arranged wheels, the two vertically-arranged wheels are arranged separately and in parallel and positioned at one side of the bottom of the control cabinet, the horizontally-arranged wheel is arranged in the middle of the other side of the control cabinet, and adjustment of a solar azimuth of the solar cooker is realized by virtue of rotation of the horizontally-arranged wheel.

Furthermore, the solar cooker further comprises an automatic control apparatus, and automatically tracking the sun is realized by virtue of the automatic control apparatus.

Particularly, the automatic control apparatus comprises two solar panels, a storage battery, a drive motor, a photosensitive sensor and a controller;

the two solar panels are respectively movably connected with the left housing and the right housing, the solar panels are configured to convert sunlight into electric energy, the two solar panels are folded relative to the left housing and the right housing when being in the non-operative state, and the two solar panels are unfolded relative to the left housing and the right housing when being in the operative state;

the storage battery is arranged in the lower control assembly, the storage battery is connected with the solar panels, the storage battery is configured to store electricity generated by the solar panels, and the storage battery is further configured to provide electric energy to the lower control assembly and the rotary apparatus;

the drive motor is connected with the rotary apparatus, and drives the rotary apparatus to make a rotational movement;

the photosensitive sensor is arranged on the inner surface of the left housing or the right housing, the photosensitive sensor is connected with the controller, and the photosensitive sensor is configured to induce a position of the sun and transmit information to the controller;

the controller is arranged in the lower control assembly, the controller controls the lower control assembly and the rotary apparatus to move, so that automatically tracking the sun is realized.

Furthermore, the solar cooker further comprises a sound system and a direct-current charging interface, the sound system and the direct-current charging interface are both arranged in the lower control assembly, the sound system is configured to realize playing of music, and the direct-current charging interface is configured to charge a mobile phone.

The advantageous effects brought about by the technical solution provided by the embodiment of the present invention are as follows:

the portable solar cooker provided by the embodiment of the present invention not only has functions of boiling water and cooking foods, but also has the advantages of facilitating carrying and tracking the sun, and can achieve full utilization of solar energy anytime and anywhere, thereby making the application of the solar energy be fully developed.

BRIEF DESCRIPTION OF THE DRAWINGS

In order to clearly illustrate the technical solution of the embodiment of the present invention, the accompanying drawings required to be used by describing the embodiment will be briefly described in the following; it is obvious that the accompanying drawings described below are only related to some embodiments of the present invention, and other accompanying drawings can be obtained according to these accompanying drawings to those of ordinary skill in the art without the exercise of inventive faculty.

Meanings of all symbol representations in the accompanying drawings are as follows:
A: upper functional assembly,
B: lower control assembly,
C: rotary apparatus,
1: photosensitive sensor, 2A: left housing, 2B: right housing, 3: hinge, 4: vacuum pipe, 5: vacuum pipe bracket, 6: fixed block, 7: electric push rod, 8: wire, 9: vertically-arranged wheel, 10: horizontally-arranged wheel, 11: control cabinet, 12: solar panel, 13: solar panel hinge, 14: lock catch, 15: handle, 16: controller, 17: sound system, 18: lame hinge, 19: hook, 20: push plate, 21: water boiling cup, 22: heat preservation cover, 23: barbecue wire mesh, 24: barbecue grill, 25: cup-shaped oil tray, 26: aviation plug, 27: bottom case, 28: reflector plate.

DETAILED DESCRIPTION OF THE INVENTION

To make the purpose, the technical solution and the advantages of the present invention be more clear, the embodiment of the present invention will be further described in detail below in conjunction with the accompanying drawings.

Figure 1:
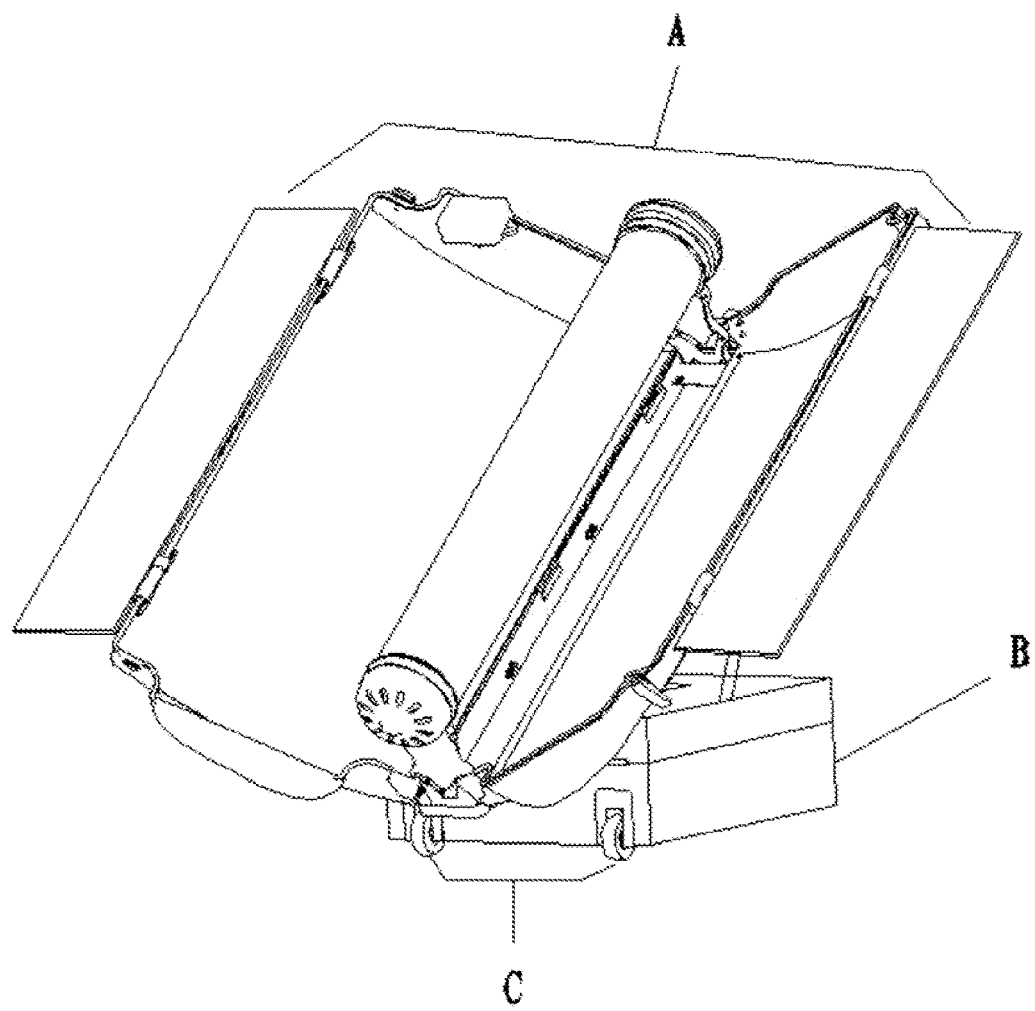
FIG. 1 is a perspective view of a portable solar cooker provided by an embodiment of the present invention.

As shown in FIG. 1, there is provided a portable solar cooker, the solar cooker comprises an upper functional assembly A, a lower control assembly B and a rotary apparatus C;

the upper functional assembly A is configured to reflect sunlight, collect heat in a focusing manner and further heat water or foods, the upper functional assembly A is closed to form a box body when being in a non-operative state, and the upper functional assembly A is opened when being in an operative state;

the lower control assembly B is connected with the upper functional assembly A, and makes the upper functional assembly B be subjected to pitch adjustment;

the lower control assembly B is connected with the rotary apparatus C, and the lower control assembly B and the upper functional assembly A are driven by the rotary apparatus C to rotate, so that tracking the sun is realized.

The embodiment of the present invention not only has functions of boiling water and cooking foods, but also has the advantages of facilitating carrying and tracking the sun, and can achieve full utilization of solar energy anytime and anywhere, thereby making the application of the solar energy be fully developed.

Figure 2:
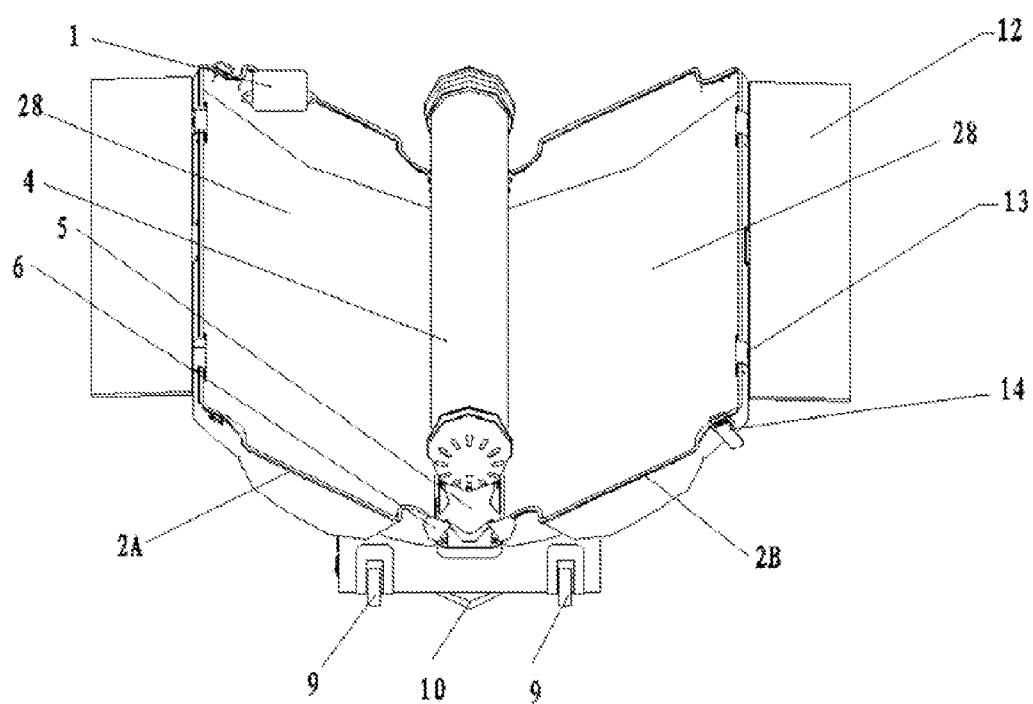
FIG. 2 is a front view of a portable solar cooker provided by an embodiment of the present invention.
Figure 3:
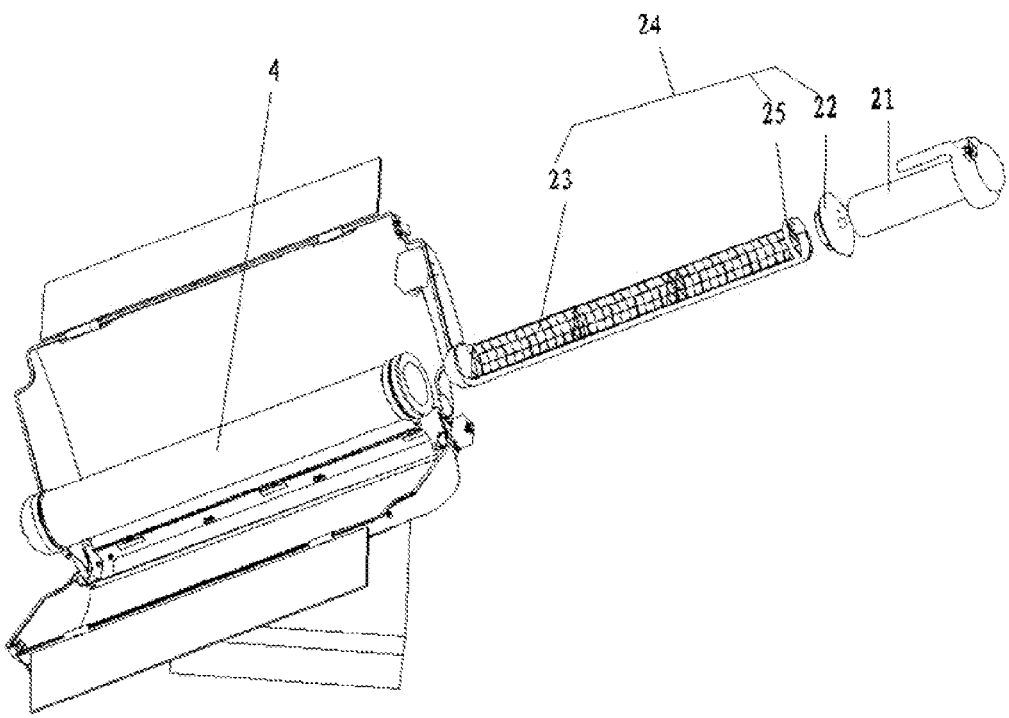
FIG. 3 is a partial exploded view of a portable solar cooker provided by an embodiment of the present invention.

As shown in FIG. 2, particularly, the upper functional assembly A comprises a bottom case 27, a left housing 2A, a right housing 2B, reflector plates 28, a vacuum pipe 4, a vacuum pipe bracket 5, a barbecue grill 24 (see FIG. 3) and a water boiling cup 21 (see FIG. 3);

two sides of the bottom case 27 are respectively provided with the left housing 2A and the right housing 2B, the left housing 2A is movably connected with the bottom case 27, the right housing 2B is movably connected with the bottom case 27, the left housing and the right in housing are closed when being in the non-operative state, and the left housing and the right housing are opened when being in the operative state;

the number of the reflector plates 28 is two, the two reflector plates 28 are respectively attached to the inner surface of the left housing 2A and the inner surface of the right housing 2B, and the reflector plates 28 are configured to reflect sunlight to the vacuum pipe 4;

the vacuum pipe bracket 5 is arranged in the middle of the bottom case 27, the vacuum pipe 4 is arranged on the vacuum pipe bracket 5, the barbecue grill 24 (see FIG. 3) is arranged inside the vacuum pipe 4, the water boiling cup 21 (see FIG. 3) is arranged on the barbecue grill 24, the vacuum pipe 4 is configured to collect heat and transmit the heat to the barbecue grill 24 and the water boiling cup 21, the barbecue grill 24 is configured to place foods, and the water boiling cup 21 is configured to place water or foods.

As shown in FIG. 2, in this embodiment, the left housing 2A is movably connected with the bottom case 27 by virtue of hinges 3, and the right housing 2B is movably connected with the bottom case 27 by virtue of hinges 3.

Certainly, those of ordinary skill in the art may appreciate that the above moveable connection may also be pin roll connection or hinge connection.

As shown in FIG. 3, in the embodiment of the present invention, the barbecue grill 24 comprises a cup-shaped oil tray 25, the outer diameter of the cup-shaped oil tray 25 is smaller than the inner diameter of the vacuum pump 4, and the cup-shaped oil tray 25 can be conveniently placed in the vacuum pipe or taken out from the vacuum pipe 4.

Furthermore, as shown in FIG. 3, a barbecue grill 23 is provided on the barbecue grill 24 as well, and arranged on the cup-shaped oil tray 25, after the water boiling cup 21 is taken out from the barbecue grill 24, one barbecue wire mesh 23 can be placed again, the embodiment of the present invention has a barbecue function by virtue of the barbecue wire mesh 23 so that more types of foods can be processed, thereby enlarging the application range of the solar cooker. When the foods are barbecued by using the barbecue grill 24 provided by the embodiment of the present invention, the foods may not be in direct contact with the vacuum pipe 4, so that the pollution to the vacuum pipe 4 is avoided, and the foods are conveniently taken out or placed.

Furthermore, as shown in FIG. 3, the end part of the barbecue grill 24 is further provided with a heat preservation cover 22.

Furthermore, as shown in FIG. 1, the solar cooker further comprises two fixed blocks, wherein the two fixed blocks 6 are respectively fixedly arranged on the left housing 2A and the right housing 2B, meanwhile, the two fixed blocks 6 are both connected with the vacuum pipe bracket 5, and the two fixed blocks 6 are configured to limit opening positions of the left housing 2A and the right housing 2B.

Furthermore, as shown in FIG. 1, the solar cooker further comprises a lock catch 14, the lock catch 14 is arranged on the right housing 2B, and the lock catch 14 is configured to lock a closing position of the upper functional assembly A.

Figure 5:
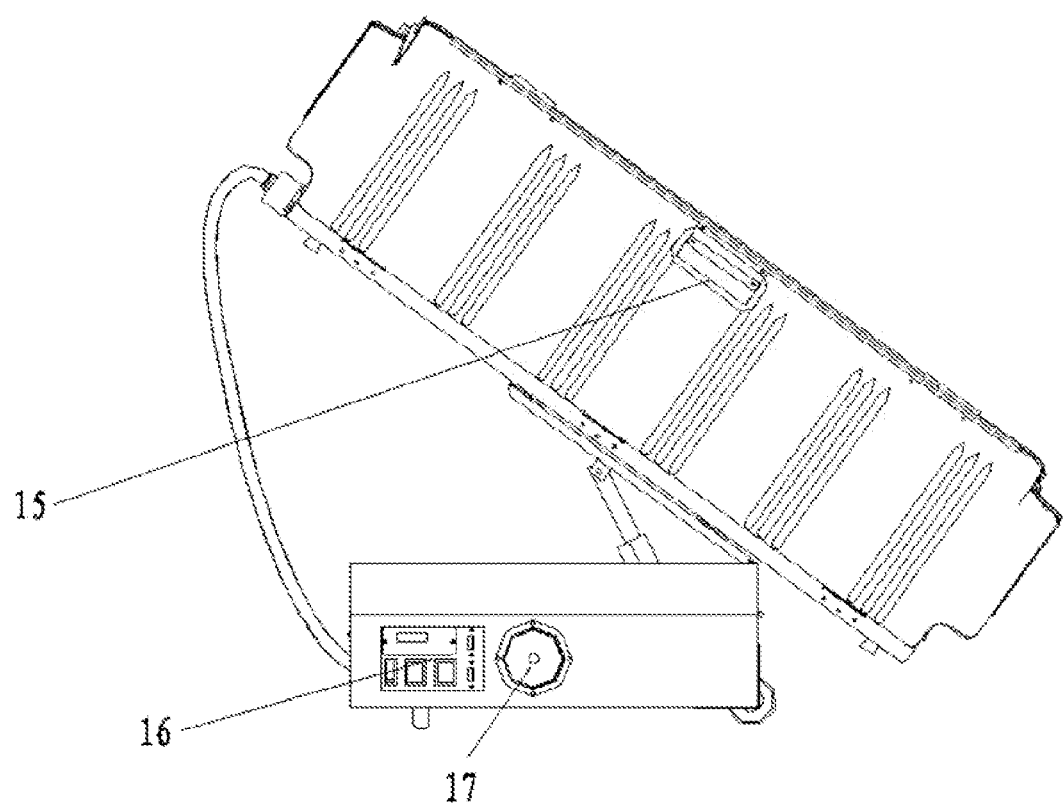
FIG. 5 is a side view of a portable solar cooker provided by an embodiment of the present invention.

Furthermore, as shown in FIG. 5, the solar cooker further comprises a handle 15, the handle 15 is arranged on the left housing 2A or/and the right housing 2B, so as to facilitate the carrying of the present invention.

Particularly, as shown in FIG. 1, the left housing 2A and the right housing 2B are both of a paraboloid shape, the two reflector plates 28 are shaped to be respectively matched with the left housing 2A and the right housing 2B, and the reflector plates 28 are also of a paraboloid shape, so that the reflection of the sunlight is facilitated. More preferably, in this embodiment, the vacuum pipe 4 is arranged at a focal point of the paraboloids of the reflector plates 28 in order to receive the sunlight.

Figure 4:
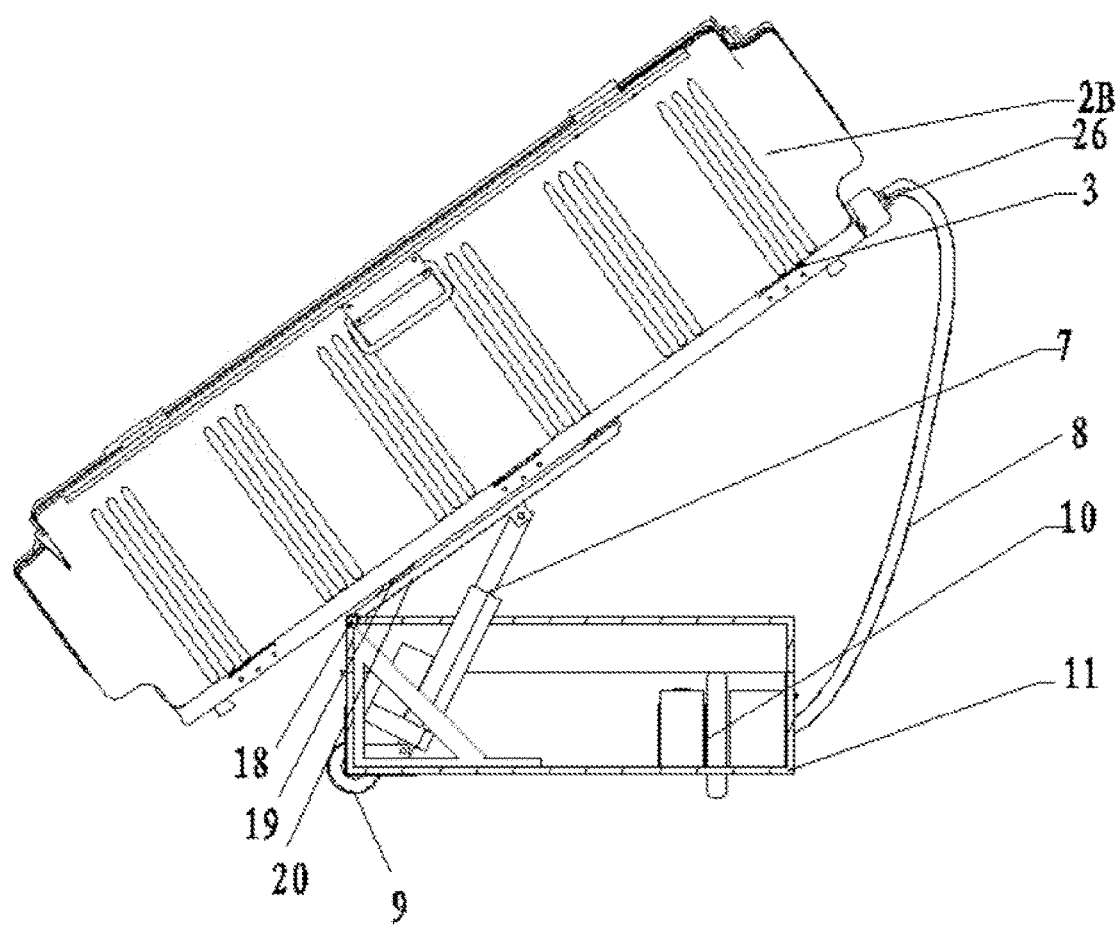
FIG. 4 is a side view when a control cabinet of a portable solar cooker provided by an embodiment of the present invention is split.

Particularly, as shown in FIG. 4, the lower control assembly B comprises a control cabinet 11, a connecting structure, a push plate 20 and a telescopic apparatus, the connecting structure and the push plate 20 are arranged outside the control cabinet 11, fixed connection between the upper function assembly A and the push plate 20 is realized by virtue of the connecting structure, one side of the push plate 20 is movably connected with the control cabinet 11, the telescopic apparatus extends out of the control cabinet 11 and is connected onto the upper in functional assembly A, the push plate 20 and the upper functional assembly A are driven by expansion and retraction of the telescopic apparatus to rotate relative to one side of the control cabinet 11, so that the pitch adjustment of the upper functional assembly A is realized, and further the adjustment of an elevating angle of the solar cooker is achieved.

Particularly, as shown in FIG. 4, movable connection between one side of the push plate 20 and the control cabinet 11 is realized by virtue of a large hinge 18.

Certainly, those of ordinary skill in the art may appreciate that the above movable connection may also be pin roll connection or hinge connection.

Particularly, the telescopic apparatus is an electric push rod 7.

Certainly, those of ordinary skill in the art may appreciate that the above telescopic apparatus may also be a hydraulic cylinder or air cylinder.

Particularly, as shown in FIG. 4, the connecting structure is a hook type structure, and comprises hooks 19 arranged on the upper functional assembly A, and slots formed in the push plate 20. More particularly, in this embodiment, the hooks 19 are fixed on the bottom case 27, and inserted in the slots on the push plate 20, so that the upper functional assembly A and the control cabinet 11 can be connected together.

Certainly, those of ordinary skill in the art may appreciate that the above connecting structure may also be a bolt type structure or snap-in type structure.

Particularly, as shown in FIG. 2, the rotary apparatus C comprises a horizontally-arranged wheel 10 and two vertically-arranged wheels 9, that is, movement directions of the two vertically-arranged wheels 9 and the horizontally-arranged wheel 10 form an angle of 90°, the two vertically-arranged wheels 9 are arranged separately and in parallel and positioned at one side of the bottom of the control cabinet 11, the horizontally-arranged wheel 10 is arranged in the middle of the other side of the control cabinet 11, and the control cabinet 11 may rotate by using a center of a connecting line of the two vertically-arranged wheels 9 at the other side as a center by virtue of rotation of the horizontally-arranged wheel 10 so that adjustment of a solar azimuth (i.e. horizontal angle) of the solar cooker is realized.

Furthermore, as shown in FIG. 1, the solar cooker further comprises an automatic control apparatus, and automatically tracking the sun is realized by virtue of the automatic control apparatus.

Particularly, as shown in FIG. 2, the automatic control apparatus comprises two solar panels 12, a storage battery (not shown in FIG. 2), a drive motor (see FIG. 4), a photosensitive sensor 1 and a controller 16 (see FIG. 5);

the two solar panels 12 are respectively movably connected with the left housing and the right housing, the solar panels 12 are configured to convert sunlight into electric energy, the two solar panels 12 are folded relative to the left housing and the right housing when being in the non-operative state, and the two solar panels 12 are opened relative to the left housing and the right housing when being in the operative state;

as shown in FIG. 4, the storage battery (not shown in FIG. 4) is arranged in the lower control assembly B (see FIG. 1), particularly, in this embodiment, the storage battery (not shown in 4) is arranged in the control cabinet 11, the storage battery (not shown in FIG. 4) is connected with the solar panels 12, and the storage battery (not shown in FIG. 4) is configured in to store electricity generated by the solar panels 12, and the storage battery (not shown in FIG. 4) is configured to further provide electric energy to the lower control assembly B and the rotary apparatus C;

as shown in FIG. 4, the drive motor (not shown in FIG. 4) is connected with the rotary apparatus C, and drives the rotary apparatus C to make a rotational movement, more particularly, as shown in FIG. 4, in this embodiment, the drive motor (not shown in FIG. 4) is connected with the horizontally-arranged wheel 10, and drives the horizontally-arranged wheel 10 to make a rotational movement;

as shown in FIG. 2, the photosensitive sensor 1 is arranged on the inner surface of the left housing or the right housing, the photosensitive sensor 1 is connected with the controller 16, and the photosensitive sensor 1 is configured to induce a position of the sun and transmit information to the controller 16;

as shown in FIG. 5, the controller 16 is arranged in the lower control assembly B (see FIG. 1), particularly, in this embodiment, the controller 16 is arranged in the control cabinet 11, and the controller 16 controls the lower control assembly B and the rotary apparatus C to move so that the automatically tracking the sun is realized.

As shown in FIG. 4, in this embodiment, a wire 8 on the control cabinet 11 is connected onto the bottom case 27 by virtue of an aviation plug 26, the wire 8 is configured to transmit electric energy generated by the solar panels 12 to the storage battery, and connect the photosensitive sensor 1, an electric push rod 7 and the drive motor. In this embodiment, the photosensitive sensor 1 is configured to induce the azimuth of the sun to control a circuit of the electric push rod 7 to be closed, forward rotation or reverse rotation of a motor in the electric push rod 7 is controlled by virtue of the difference of directions of currents in the storage battery, so that pushing and withdrawing the electric push rod 7 are realized, and thus the elevating angle of the sun is adjusted, similarly, forward rotation or reverse rotation of the drive motor is controlled by virtue of the difference of directions of currents in the storage battery, so that anticlockwise rotation and clockwise rotation of the horizontally-arranged wheel 10 are realized, and thus the solar azimuth of the solar cooker is adjusted.

As shown in FIG. 2, movable connection between the solar panels 12 and the left housing 2A or right housing 2B is realized by virtue of hinges 13 of the solar panels. Certainly, those of to ordinary skill in the art may appreciate that the above movable connection may also be pin roll connection or hinge connection.

Furthermore, as shown in FIG. 5, the solar cooker further comprises a sound system 17 and a direct-current charging interface, the sound system 17 and the direct-current charging interface (not shown in FIG. 5) are both arranged in the lower control assembly 13 (see FIG. 1), particularly, in this embodiment, the sound system 17 and the direct-current charging interface (not shown in FIG, 5) are both arranged in the control cabinet 11, the sound system 17 is configured to realize playing of music, and the direct-current charging interface is configured to charge a mobile phone.

Above serial numbers of the embodiment of the present invention are for the purpose of description only and are not intended to represent the grade of the embodiment.

The above descriptions are only preferred embodiments of the present invention, but are not in intended to limit the present invention, various modifications, equivalent substitutions, improvements and the like made within the spirit and the principle of the present invention are all comprised within the protective scope of the present invention.

INDUSTRIAL APPLICABILITY

The embodiment of the present invention not only has functions of boiling water and cooking foods, but also has the advantages of facilitating carrying and tracking the sun, and can achieve full utilization of solar energy anytime and anywhere, thereby making the application of the solar energy be fully developed.

The invention claimed is:

1. A portable solar cooker, characterized in that said solar cooker comprises an upper functional assembly, a lower control assembly and a rotary apparatus which are sequentially connected;

said upper functional assembly is configured to reflect sunlight, collect heat in a focusing manner and further heat water or foods, said upper functional assembly is closed to form a box body when being in a non-operative state, and said upper functional assembly is opened when being in an operative state;

said lower control assembly is connected with said upper functional assembly, and makes said upper functional assembly be subjected to pitch adjustment;

said lower control assembly is connected with said rotary apparatus, and said lower control assembly and said upper functional assembly are driven by said rotary apparatus to rotate so that tracking the sun is realized.

2. The portable solar cooker according to claim 1, characterized in that said upper functional assembly comprises a bottom case, a left housing, a right housing, reflector plates, a vacuum pipe, a vacuum pipe bracket, a barbecue grill and a water boiling cup;

two sides of said bottom case are respectively provided with said left housing and said right housing, said left housing is movably connected with said bottom case, said right, housing is movably connected with said bottom case, said left housing and said right housing are closed when being in the non-operative state, and said left housing and said right housing are opened when being in the operative state;

the number of the reflector plates is two the two reflector plates are respectively attached to the inner surface of said left housing and the inner surface of said right housing, and said reflector plates are both configured to reflect sunlight to said vacuum pipe;

said vacuum pipe bracket is arranged in the middle of said bottom case, said vacuum pipe is arranged on said vacuum pipe bracket, said barbecue grill is arranged inside said vacuum pipe, said water boiling cup is arranged on said barbecue grill, said vacuum pipe is configured to collect heat and transmit the heat to said barbecue grill and said water boiling cup, said barbecue grill is configured to place foods, and said water boiling cup is configured to place water or foods.

3. The portable solar cooker according to claim 2, characterized in that said left housing and said right housing are both of a paraboloid shape, and the two reflector plates are shaped to be respectively matched with said left housing or said right housing.

4. The portable solar cooker according to claim 1, characterized in that said lower control assembly comprises a control cabinet, a connecting structure, a push plate and a telescopic, apparatus, said connecting structure and said push plate are arranged outside said control cabinet, fixed connection between said upper functional assembly and said push plate is realized by means of said connecting structure, one side, of said push plate is movably connected with said control cabinet, said telescopic apparatus extends out of said control cabinet and is connected onto said upper functional assembly, said push plate and said upper functional assembly are driven by expansion and retraction of said telescopic apparatus to rotate relative to one side of said control cabinet, so that pitch adjustment of said upper functional assembly is realized, and further adjustment of an elevating angle of said solar cooker is realized.

5. The portable solar cooker according to claim 4, characterized in that said telescopic apparatus is an electric push rod.

6. The portable solar cooker according to claim 4, characterized in that said connecting structure is a hook type structure, and comprises hooks arranged on said upper functional assembly and slots formed in said push plate.

7. The portable solar cooker according to claim 1, characterized in that said rotary apparatus comprises a horizontally-arranged wheel and two vertically-arranged wheels, the two vertically-arranged wheels are arranged separately and in parallel and arranged at one side of the bottom of said control cabinet, said horizontally-arranged wheel is arranged in the middle of the other side of said control cabinet, and adjustment of a solar azimuth of said solar cooker is realized by virtue of rotation of said horizontally-arranged wheel.

8. The portable solar cooker according to claim 1, characterized in that said solar cooker further comprises an automatic control apparatus, and automatically tracking the sun is realized by virtue of said automatic control apparatus.

9. The portable solar cooker according to claim 8, characterized in that said automatic control apparatus comprises two solar panels, a storage battery, a drive motor, a photosensitive sensor and a controller;
the two solar panels are respectively movably connected with said left housing and said right housing, said solar panels are configured to convert sunlight into electric energy, the two solar panels are folded relative to said left housing and said right housing when being in a non-operative state, and the two solar panels are opened relative to said left housing and said right housing when being in an operative state;
said storage battery is arranged in said lower control assembly, said storage battery is connected with said solar panels, said storage battery is configured to store electricity generated by said solar panels, and said storage battery is configured to further provide electric energy to said lower control assembly and said rotary apparatus;
said drive motor is connected with said rotary apparatus, and drives said rotary apparatus to make a rotational movement;
said photosensitive sensor is arranged on the inner surface of said left housing or said right housing, said photosensitive sensor is connected with said controller, and said photosensitive sensor is configured to induce a position of the sun and transmit information to said controller;
said controller is arranged in said lower control assembly, and controls said lower control assembly and said rotary apparatus to move, so that automatically tracking the sun is realized.

10. The portable solar cooker according to claim 9, characterized in that said solar cooker further comprises a sound system and a direct-current charging interface, said sound system and said direct-current charging interface are both arranged in said lower control assembly, said sound system is configured to realize playing of music, and said direct-current charging interface is configured to charge a mobile phone.

\* \* \* \* \*